Figure 1:
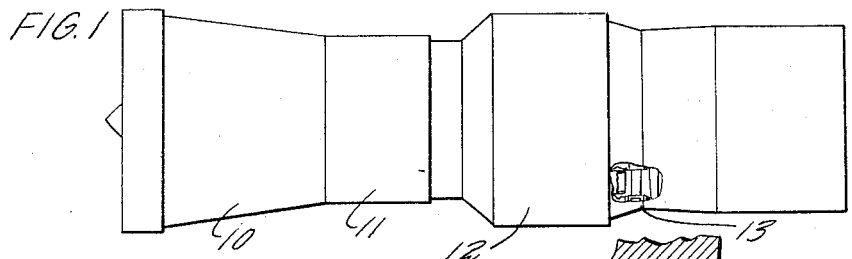

INVENTORS
T. G. WOODWELL
M. C. BENEDICT
A. A. GIOTTO

BY Charles A. Warren
ATTORNEY

# United States Patent Office 3,295,824
Patented Jan. 3, 1967

3,295,824
TURBINE VANE SEAL
Thornton G. Woodwell, West Hartford, and Marcus C. Benedict, Glastonbury, Conn., and Angelo A. Giotto, Rochester, N.Y., assignors to United Aircraft Corporation, East Hartford, Conn., a corporation of Delaware
Filed May 6, 1966, Ser. No. 548,112
7 Claims. (Cl. 253—39.1)

This invention broadly relates to jet aircraft engines of the well-known United Aircraft JT4 type. More particularly the invention relates to improved means for accommodating differential thermal expansions of the first stage turbine vanes which are located between the burner casing and the several downstream turbine blades that drive the rotor shafts connected to the low and high pressure compressors upstream of the burners.

It is important that cooling air be distributed to the first stage turbine inlet guide vanes in such manner that the differential thermal expansions occurring in the inner and outer turbine casings be accommodated and appropriate compensation provide for the inevitable relative movement between the vane and its associated shrouding and its supporting structure (i.e. the engine casing) as well as making provision for adequate flow of cooling air through the vane-supporting structure to and through the vanes without significant cooling air loss. It has been proposed to discharge cooling air through a nozzle in each vane into the expansion zone of the turbine so as to form a protective layer of relatively cool air for flow over the surface of the turbine rotor (see Price 2,468,461). In accordance with our concept, we consider it inadvisable to subject the rotor blades directly to cooling air but rather to lead a tempered flow of high pressure and temperature gases to the blades from the first stage vanes intervening the burner and the turbine blades.

It should be borne in mind that the inner and outer casings of the burner are subject to substantial temperature differentials and accordingly react differently in expansion characteristics that are necessarily reflected on the connected shrouding structure of the first stage vanes upstream of the turbine blades. Stresses result from these thermal variations that are reflected in the orientation of the shrouding support of the vanes, and accordingly of the vanes themselves both axially and radially, relative to the axis of the turbine and its drive shaft and must be accommodated and compensated for if maximum turbine efficiency and useful life is to be attained. In other words, the temperature differentials occurring in the outer and inner casings of the burners result in expansion stresses that are variously exerted on the shrouding structure of the first stage vanes that inevitably cause an axial and radial de-orientation of the vanes relative to the axis of the turbine blades. Unless such de-orientation is accommodated, flow of cooling air into the vane structure is difficult of attainment without loss of cooling air and a resulting appreciable loss in turbine efficiency, and stresses damaging to the vane and adjacent structure may be generated.

We accordingly propose to introduce cooling air flowing from the annular space defined by the insulated duct wall of the burner and the outer casing of the engine to and through an appropriately apertured ring into an annular chamber circumscribing the first stage vanes and thence from such chamber to and through the vanes, provision being made for relative movement between the vanes and their supporting shrouding and the engine's outer and inner casings.

In view of the foregoing it will appear that among the objects of our invention, one is to provide an air-tempering system for a circumferential array of jet engine turbine vanes that is characterized by simplicity in construction, low cost manufacture, efficient and reliable operation and dependability over an extended period of use. Other objects will be in part apparent and in part pointed out hereinafter.

Figure 2:
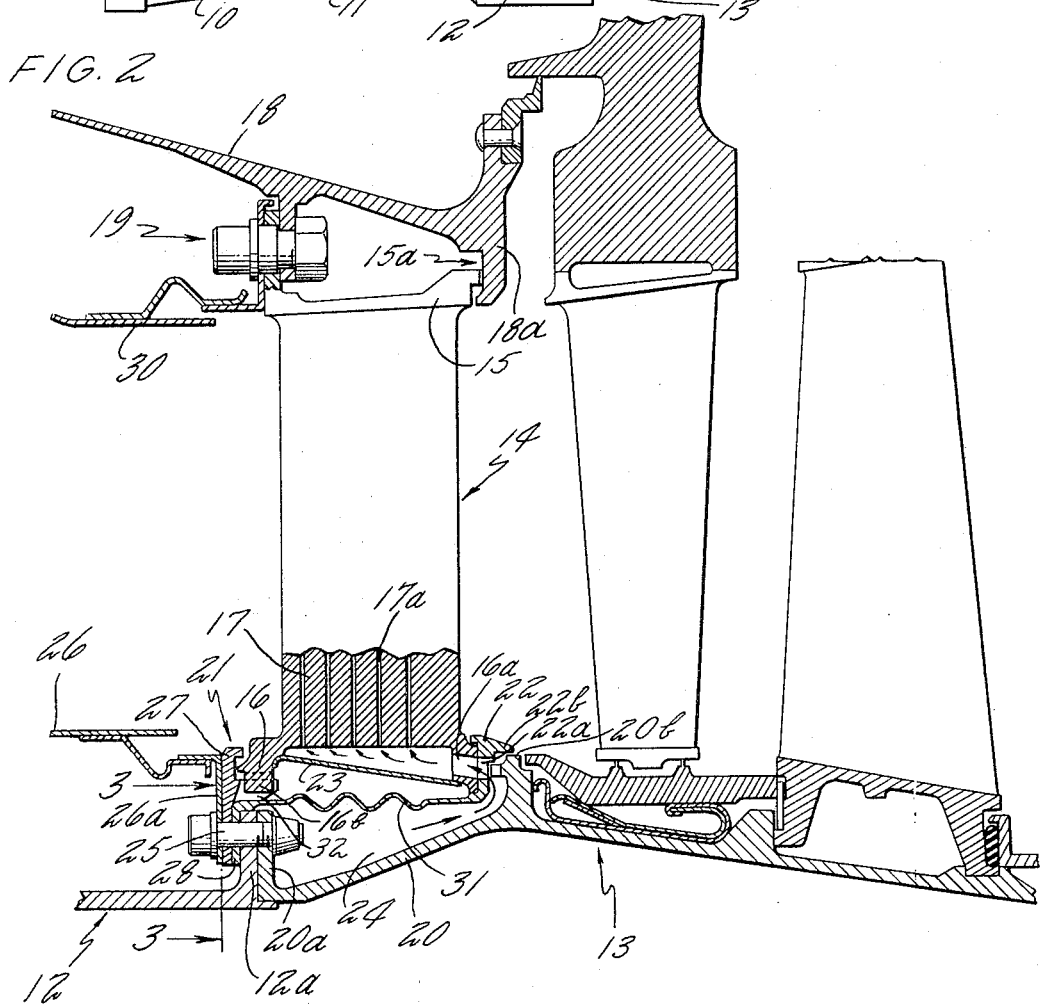
Figure 3:
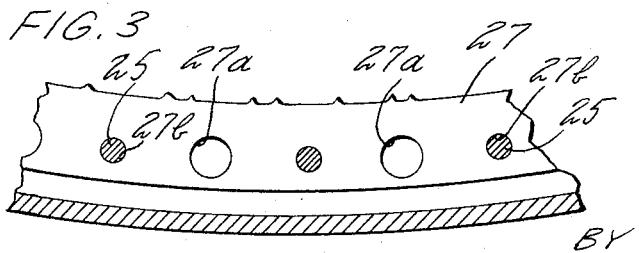

In the drawing where we have shown a preferred embodiment of our invention and wherein similar reference characters refer to similar parts throughout the several views:

FIGURE 1 is a schematic view of a jet engine incorporating certain features of our invention;
FIGURE 2 is an enlarged fragmentary vertical section taken along the axis of the engine, portions being shown in section; and
FIGURE 3 is a fragmentary vertical section taken along line 3—3 of FIGURE 2.

In accordance with our invention, we install at the outlet end of the engine burner, as circumscribed by outer and inner casings forming an annular casing around the engine's burner cage, an annular orificed ring by which the burner casings may be attached to the turbine casings that house the first stage turbine vanes as well as the several stages of turbine blades and additionally provide bearing support for the compressor rotor to which the turbine blades are attached. To the inner casing of the turbine housing is attached an inner vane shroud carrying the inner portions of the first stage vanes. An outer annular shroud, to which the outer ends of the vanes are attached, is associated with the outer turbine casing for movement relative thereto in both axial and radial directions and thus, with the inner shroud, supports a circumferential array of vanes connected interiorly and exteriorly to the inner and outer shrouds respectively. The periphery of the outer vane shroud forms with the outer concentric turbine casing, an annular cooling air chamber that communicates with the aforementioned orificed ring, thereby to receive air from the chamber surrounding the burner. Means are provided, as will be described in detail hereinbelow, for accommodating relative movement between the peripheral portions of the vanes and its connected shrouding and the adjacent, or rather juxtaposed inner portions of the outer casing which house the turbine blades to assure adequate flow of cooling air into and through the several vanes without significant loss of such air. As will be described below, we provide diaphragm means between the outer burner casing and a peripheral plate that is secured to upstream and downstream portions of the outer shroud which circumscribes the turbine vanes. This plate forms with the outer vane shroud an air chamber that communicates with the aforesaid casing chamber thus to receive cooling air therefrom and conduct it to cooling air passages formed in the vanes. The said diaphragm not only separates the two communicating chambers but also maintains the two chambers in discrete relationship regardless of any relative movement between the vanes and the turbine casings. As will be described below, our invention further comprises novel joint structure interrelating the outer vane shroud and the adjacent portions of the outer turbine casing which permits and accommodates relative movement between such shroud and casing both axially and radially to the latter.

More particularly and with reference to the schematic view of a jet engine as shown in FIGURE 1, the engine may comprise a low pressure compressor 10, a high pressure compressor 11, a burner section 12 and a turbine section 13, the turbine (not shown) being connected in conventional manner to the engine's drive shaft (not shown) which drives the compressors 10 and 11 in the well-known manner. Our invention, as herein disclosed, relates to the turbine section 13 hence no further description of the related elements of the engine need be given.

As shown in FIGURE 2 which illustrates a portion of the turbine section 13 below the axis of the engine and a portion of the downstream end of the burner 12 which is connected to the upstream end of the turbine section, a first stage vane generally indicated at 14 includes inner and outer shroud elements 15 and 16 respectively at the opposite ends of the airfoil portion of the vane. Each vane is provided with a plurality of air passages 17a. The inner shroud 15 for each vane is secured to an inner turbine casing 18 by suitable anchor means 19 at the upstream end of turbine section 13. The outer shroud 16 for each vane is movably secured at its outer edge to an outer turbine casing 20 by an interlocking lug connection generally indicated at 21 as will be described in more detail hereinbelow. The downstream edge of outer shroud 16 has associated therewith a sealing ring 22 which is movably secured to portion 20a of casing 20 as will be later described in detail.

The outer peripheries of shrouds 16 are in contact with an annular shield 31 which with casing 20 forms a chamber 24 adapted to receive air from the outer burner casing 12. This casing 12 surrounds an outer duct wall 26 having an outwardly directed annular flange 26a which is bolted to casing flange 20a by a circumferentially arranged group of bolts, such as bolt 25. Interposed between the heads of bolts 25 and outer burner casing flange 12a are three members; the annular plate 26a comprising a portion of the outer duct wall 26 disposed within burner section 12; an annular ring 27 and an annular flange member 28. These three members are tightly clamped against casing flange 20a by bolts 25. Ring 27 (see FIG. 3) is provided with a plurality of air holes 27a and a plurality of bolt holes 27b through which bolts 25 (FIG. 2) extend to fasten the ring 27 to flange 12a. Suitable holes are provided in plate 26a and flange 28 registering with holes 27b whereby the aforesaid three members are attached to casing flange 20a by bolts 25. Plate 26a, ring 27 and flange 28 are suitably perforated to permit airflow from within casing 12 into chamber 24. This airflow is, of course, relatively cool, i.e. tempered, as it flows through the annular passage surrounding the hot gas passage defined by outer duct wall 26 and an inner duct wall 30. From the foregoing it will be seen that outer burner casing 12, outer duct wall 26, ring 27 and flange 28 are securely locked to turbine casing flange 20a, thus precluding any relative movement therebetween.

As indicated above the high velocity hot gas flow into turbine section 13 from burner section 12 impresses a substantial axial load and, indeed, a radial one because of thermal expansion on vanes 17, the stress of such having to be borne by the vanes and their supporting shrouds and bearings. Accordingly, means in accordance with our invention, are provided to accommodate relative movement between vanes 17 and their outer shroud 16, and turbine casing 20. Thus, and still with reference to FIGURE 2, the upstream end of outer shroud 16 is provided with a peripheral array of teeth 16b adapted to interfit with a similarly arranged array of slots 32 in ring 27, these teeth 16b and slots 32 accordingly comprising a splined connection between shroud 16 and ring 27 which permits relative radial movement between the shroud (and the vanes 17 attached thereto) and the ring thus accommodates radial expansion of the vanes and also relative axial movement therebetween.

As noted above, seal ring 22 supports the downstream end of shroud elements 16 and has a circumferential series of air holes 22a which register with a similarly arranged series of holes 16a formed in the downstream edges of shroud elements 16. Seal ring 22 also preferably includes a finger flange 22b juxtaposed to an inner annular abutment 20b, this flange and abutment serving to limit the downstream flow of cooling air. Flange 28 and ring 22 comprise fore-and-aft anchors for an annular flexible diaphragm 31 which is disposed between shield 23 and casing 20 and which, accordingly with casing 20 forms air chamber 24. It follows that air flowing into chamber 24 is conducted around diaphragm 31, to and through the holes 22a in sealing ring 22 and the holes 16a in shroud 16 and thence to the air passages 17a in vanes 17.

The upstream end of inner vane shroud elements 15 is flexibly secured to inner casing 18 by anchor 19 while the downstream end of these inner shroud elements is supported by portion 18a of the inner casing.

It will now appear that the turbine vanes are supported by the inner and outer casings in such manner as to permit relative motion therebetween. Because of differential thermal expansions of these casings in the axial direction, the vanes tilt when the turbine is operating. This tilt, of course, varies and is a function of aircraft speed and altitude. Because of these variations in tilt, we have provided the above-described sealing means and the coacting structure which assures optimum performance of the aircraft turbine. By virtue of the "flexible" connections between the vanes and casing and the provision of the seal ring and its fulcrum relation to the outer casing we have provided an axial reaction to the vane gas load. Thus the seal ring acts like a "see-saw," the bellows or diaphragm being provided to absorb any axial movement of the seal ring.

While the foregoing discloses the preferred embodiment of our invention it is to be interpreted as illustrative and not in a limiting sense as various modifications of the disclosed structure are apparent but within the scope of our invention.

We claim:

1. In a turbine construction, the combination of an annular array of vanes,
   inner and outer shroud elements attached to the inner and outer ends of the vanes, each of said vanes having cooling air passages therein,
   inner and outer turbine casings respectively surrounding said inner and outer shroud elements,
   means forming a connection between said outer shroud elements and the related outer casing to permit relative movement in radial and axial directions therebetween, said outer shroud elements and said outer casing defining a chamber,
   means to introduce cooling air into said chamber,
   and partition means in said chamber for directing air to the downstream end of said outer shroud elements, said outer shroud elements having passages formed therein communicating with said vane passages.

2. Turbine construction according to claim 1 wherein said partition means comprises a flexible diaphragm to accommodate said relative movement.

3. Turbine construction according to claim 1 wherein an annular ring is secured to the upstream end of said outer casing and is bored to provide air passages into said chamber.

4. Turbine construction according to claim 3 wherein means are provided forming a splined connection between the upstream end of said outer shroud elements and an inner peripheral portion of said ring.

5. Turbine construction according to claim 1 wherein an annular seal ring supports the downstream end of said outer shroud elements, said seal ring being provided with a plurality of air passages communicating said chamber with said vane passages,
   and means forming a relative movement connection between said seal ring and said outer casing to accommodate vane tilt resulting from gas load on the vanes.

6. In turbine construction, the combination of an outer annular casing,
   an annular array of vanes having their outer ends positioned in said casing and extending inwardly therefrom,
   outer shroud elements connected to the outer ends of said vanes and having upstream and downstream edges, means on said casing engaging with the upstream edge of said shroud elements to locate said vanes circumferentially with respect to said casing, a sealing ring associated with the downstream edge of said shroud elements and with said casing to locate said shroud radially, cooperating means on said ring and casing for locating said ring axially and radially and to permit limited relative movement between said ring and said casing both radially and axially, and a flexible sleeve interconnecting said ring and an upstream portion of said casing adjacent the upstream edge of said shroud elements.

7. Turbine construction according to claim 6 wherein said sleeve defines an annular air passage chamber between the outer ends of said vanes and said sleeve.

No references cited.

MARTIN P. SCHWADRON, *Primary Examiner.*

E. A. POWELL, *Assistant Examiner.*